United States Patent [19]
Pinto

[11] 3,748,968
[45] July 31, 1973

[54] ROTARY FLUID CYLINDER FOR SELF-CENTERING CHUCK

[75] Inventor: Franca Pinto, Turin, Italy

[73] Assignee: Mario Pinto S.P.A., Turin, Italy

[22] Filed: Apr. 7, 1971

[21] Appl. No.: 132,025

[30] Foreign Application Priority Data
May 9, 1970 Italy.............................. 68605 A/70

[52] U.S. Cl........................ 91/420, 91/422, 92/106, 279/4
[51] Int. Cl...................... F15b 11/08, F15b 13/042
[58] Field of Search...................... 91/420, 422, 222, 91/228; 279/4; 92/106

[56] References Cited
UNITED STATES PATENTS

| | | | |
|---|---|---|---|
| 3,364,823 | 1/1968 | Benjamin et al...................... | 91/420 |
| 3,369,464 | 2/1968 | Blattry.................................. | 91/420 |
| 3,411,415 | 11/1968 | Benjamin et al...................... | 91/420 |
| 3,451,314 | 6/1969 | Smrekar................................ | 279/4 |
| 3,641,875 | 2/1972 | Kodalle................................ | 91/420 |

Primary Examiner—Paul E. Maslousky
Attorney—Sughrue, Rothwell, Mion, Zinn & Macpeak

[57] ABSTRACT

A rotary cylinder for a self-centering chuck has two valve units in its interior to prevent escape of fluid from the cylinder should the pressure fail in the conduit supplying fluid to keep the chuck jaws locked. The valve units each comprise inner and outer tubes passing through the piston, an annular space being defined between them, the inner tube communicating with a conduit passing through the cylinder body, an annular ridge on the outer surface of the inner tube, a hole in the wall of the inner tube adjacent the ridge and on a first side of it, and holes in the ends of the outer tube to communicate with the chambers into which the piston divides the cylinder. A closure member is located between the tubes on the second side of the ridge, being biased towards the ridge. A control member is sealingly slidable in the first part between the tubes and has a projection which can, under a pressure differential, move the closure member off the ridge to permit fluid to flow past the ridge and the closure member and thus enter the chamber beyond the closure member.

5 Claims, 3 Drawing Figures

ROTARY FLUID CYLINDER FOR SELF-CENTERING CHUCK

This invention concerns rotary fluid cylinders for the control of self-centering chucks for lathes.

As is known, in some types of self-centering lathe chucks, the jaws which lock the work piece are controlled by oscillating levers, housed in seats formed in the chuck body. The levers are in turn all controlled by an axial tension member which is actuated by a double-acting hydraulic cylinder, fixed to one end of the rotary shaft of the chuck.

The hydraulic cylinder is connected by flexible conduits to a source of fluid under pressure in such a way that it is possible to move the oscillating levers, and therefore the jaws in both directions.

Usually the conduits for supplying and recovering the fluid under pressure are provided with security valves, adapted to intervene to stop the circulation of fluid when a breakdown takes place in the hydraulic system. Because such valves are located outside the cylinder, they can intervene effectively for all breakdowns which occur upstream of the cylinder, namely at points located between the valves and the source of fluid under pressure.

On the other hand, for breakdowns which occur downstream of such valves, no practical remedy exists. Such a situation can be very dangerous since a sudden fall of pressure in the hydraulic circuit can cause loosening of the jaws and the violent expulsion of the workpiece under centrifugal force.

Another drawback is that the tension member which controls the jaws as difficult to regulate because of the different lengths of the chucks and of the heads of the lathes. This makes it very laborious to set the machine, and hinders the interchangeability of the cylinders in such lathes.

Moreover in rotary cylinders of known type a significant heating of the cylinder takes place, caused by the high pressures of the fluid in circulation.

The invention has the object of overcoming the drawbacks mentioned above by providing a rotary hydraulic cylinder which has high safety characteristics as regards possible drops in pressure in the circuit, and which is able in such circumstances to prevent release of the jaws.

Another object of the invention is to provide a rotary hydraulic cylinder which allows convenient, easy and precise regulation of the tension member which connects the cylinder to the self-centering chuck.

Another object is to provide a rotary cylinder in which eccessive heating of the cylinder is effectively combated.

The invention provides a rotary fluid cylinder for the control of a self-centering chuck, the cylinder containing a piston that is adapted to be connected to a tension member extending into the chuck, the piston dividing the cylinder into two chambers, and including a conduit for fluid leading into each chamber, and valve means located within the cylinder and adapted, when fluid is supplied under pressure through either one of the conduits, to permit the flow of fluid through that conduit and the discharge of fluid through the other conduit; the valve means being further adapted, when the pressure in the conduit through which fluid is supplied drops below a predetermined value, to close that conduit.

Figure 1:
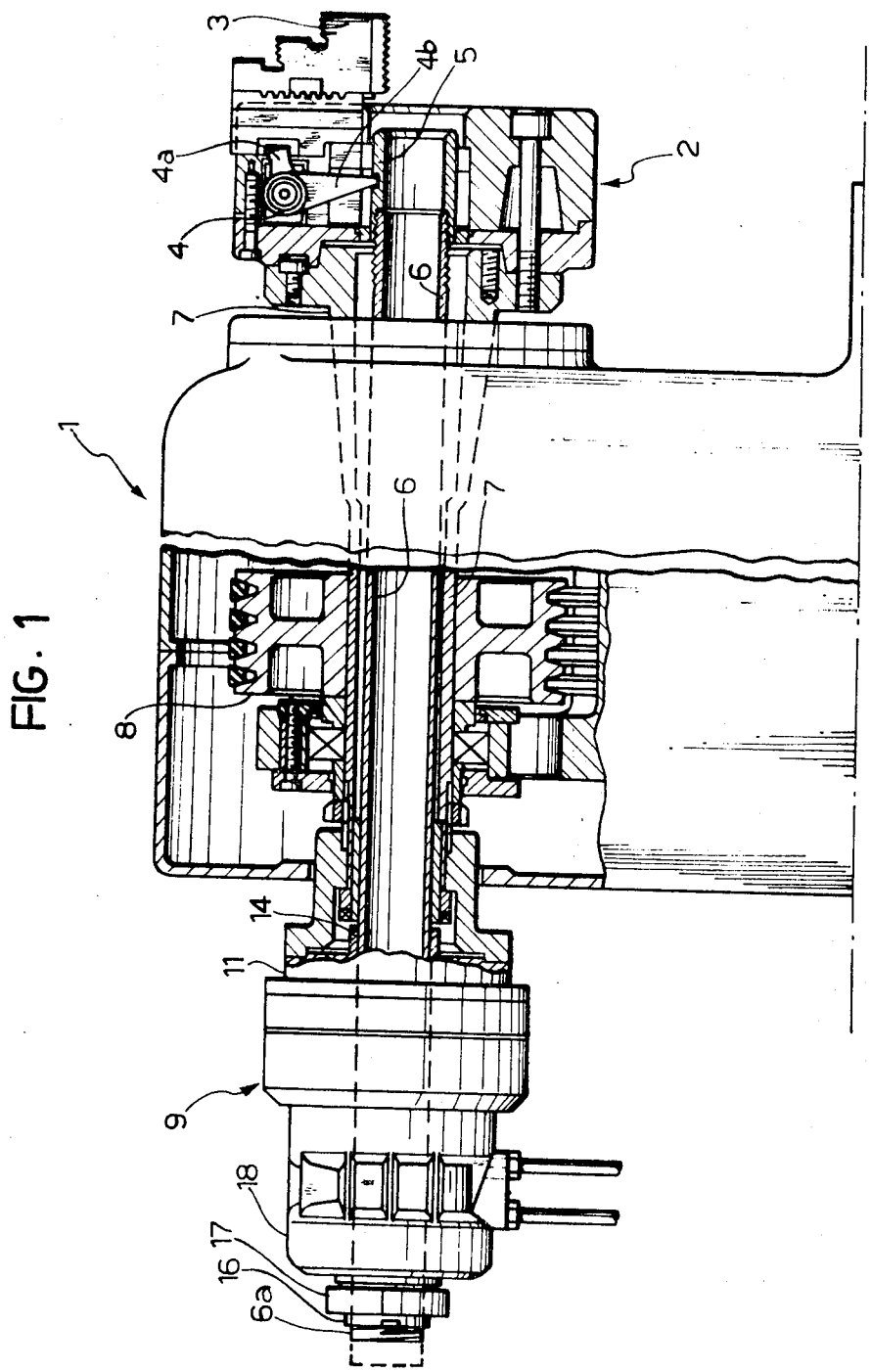
FIG. 1 is a schematic side view in elevation, partly sectioned, of a lathe head which incorporates a rotary hydraulic cylinder according to the invention to control a self-centering chuck.

A support 1 for a lathe head is provided with a self-centering chuck 2 whose jaws 3 are radially controlled by oscillating levers 4, housed in radial seats formed in the chuck. Each such lever has a short arm 4a which engages a jaw 3, and a long arm 4b which is controlled by the movement of a grooved tubular head 5 carried by a tubular tension member 6, housed slidably and coaxially in a hollow control shaft 7 which carries the chuck 2 at one end. The control shaft 7 is rotated by an external motor (not illustrated), which transmits movement to a control pulley 8. The other end of the shaft 7 carries a rotary hydraulic cylinder 9, which has the task of controlling the axial movements of the tension member 6.

Figure 2:
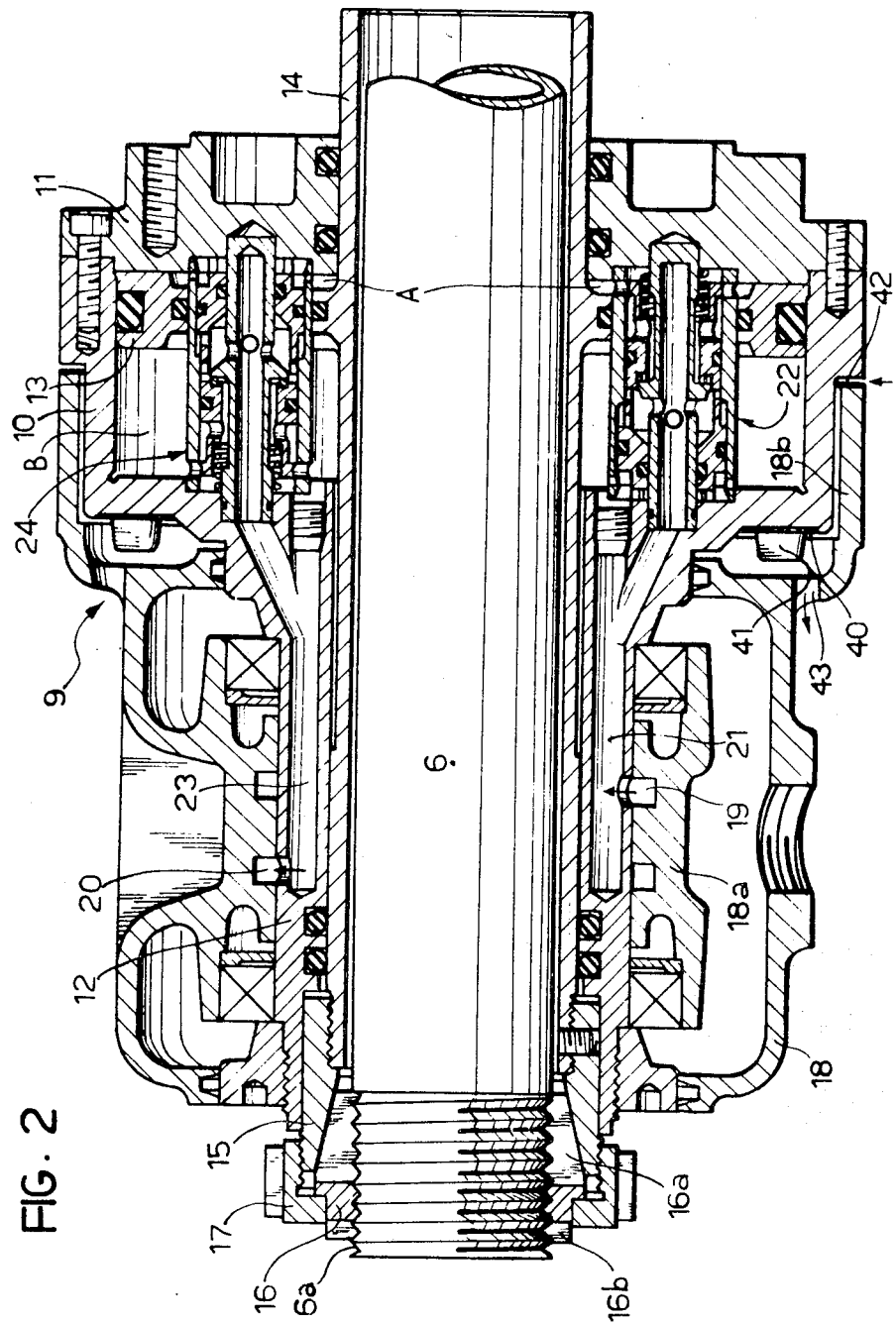
FIG. 2 is an axial section on a reduced scale of the cylinder of FIG. 1.

As seen in FIG. 2, the rotary hydraulic cylinder 9 comprises a cylinder 10, closed at one end by a separate head 11 and provided its other end with a tubular appendix 12 of reduced diameter. In the cavity of the cylinder 10 slides sealingly a piston 13, solidly fixed to a tubular member 14 which, as described below, is connected to the tension member 6.

Fixed to the rear end (i.e., the end seen on the left in FIG. 2) of the member 14 is a tubular appendix 15 having a frusto-conical cavity which tapers convergingly towards the chuck (i.e., towards the right in FIG. 2). The appendix 15 is provided with external threading. With this appendix co-operates an expansible collet 16 that is provided with spring sectors 16a and is internal threaded. This collet screws on to a threaded rear part 6a of the tension member 6 and is locked in the cavity of the appendix 15 by a ring nut 17, screwed on to the threaded external part of such appendix. The collet 16 is provided with notches 16b accessible from outside the lathe head and which allow the collet to be rotated. This causes screwing-on or unscrewing with respect to the tension member 6 and thus allows regulation of the axial position of the tension member 16 with extreme precision, in order to synchronize the movements of the piston 13 property with the movements of the levers 4 which control the jaws 3 of the chuck. By fully screwing on the external ring nut 17 it is possible to lock the collet 16 angularly on the tension member, fixing the collet solidly with the member 14 of which the piston 13 forms part.

The tubular appendix 12 of the rotary cylinder 10 is surrounded by a fixed shaped cowl 18, provided with an internal tubular part 18a whose internal surface is in sealing contact with the tubular appendix 12 of the cylinder 10. In the internal part 18a of the cowl 18 are formed two annular manifolds 19 and 20, communicating (by passages not shown) with supply and return conduits (not shown) for fluid under pressure and placed in communication, by means of radial apertures in the appendix 12, with two longitudinal conduits 21, 23 formed in the appendix 12.

The conduits 21 and 23 are controlled respectively by valve units 22 and 24, so that the conduit 21, as will emerge more fully below, leads into a chamber A of the cylinder 10 and the conduit 23 leads into a chamber B. The valve units 22 and 24 are arranged longitudinally from end to end of the cylinder 10 and pass sealingly through the piston 13. These valve units control the passage of fluid into and from the cylinder so that fluid entering through the conduit 21 causes retraction of the piston, and when entering through the conduit 23 causes advance of the piston.

Figure 3:
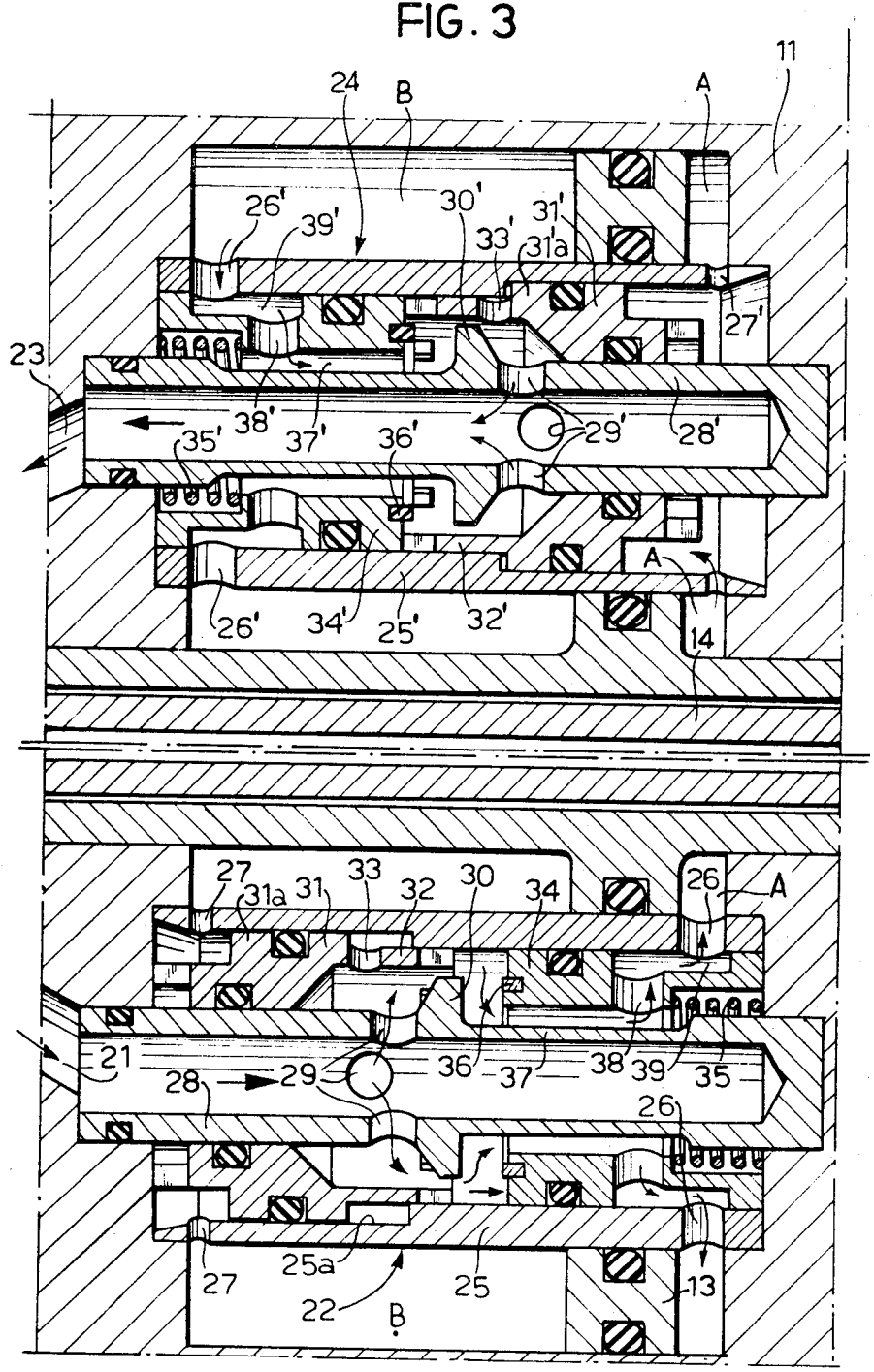
FIG. 3 is a schematic axial section, on an enlarged scale, illustrating the functioning of two valve units incorporated in the cylinder of FIGS. 1 and 2.

As seen in FIG. 3, each of the valve units 22,24 is similar to the other and is mounted symmetrically with respect to the other, in such fashion as to ensure correct functioning when fluid enters the cylinder 10 in either direction.

For the sake of simplicity only the valve unit 22 will be fully described, corresponding components of the valve unit 24 being identified by corresponding reference numerals followed by a dash. 45°

The valve unit 22 comprises a fixed outer tube 25 passing sealingly through the piston 13 and extending from end to end of the cylinder 10. It is provided near its ends with radial holes 26, 27 in its wall, which holes communicate respectively with the two chambers A,B into which the cylinder is divided by the piston 13. Inside the outer tube 25 is a fixed inner tube 28, arranged with radial clearance so that an annular space is defined between the tubes 25, 28. The inner tube 28 has an open end which communicates with the conduit 21 in the cylinder 10, through which fluid is shown by arrows to be entering. The tube 28 has a ridge 30 on its outer surface, the ridge dividing the valve unit transversely into a first part and a second part. In the first part, adjoining the ridge 30, is at least one hole 29 in the wall of the inner tube 28.

Also in the first part of the valve unit, between the tubes 25 and 28, is arranged a slidable cup-shaped control element 31, having a tubular projection 32 which extends towards the second part of the valve and which is provided with radial apertures 33 and which, in one position, loosely surrounds the ridge 30. A radial extension 31a of the element 31 slides sealingly in a zone 25a of greater diameter of the outer tube 25. The radially inner surface of the element 31 slides sealingly on the inner tube 28.

In the second part of the valve unit is disposed a slidable cup-shaped member 34, which is biased by a spring 35 reacting against the cylinder head 11 to form a closure member. The member 34 is provided, on its face directed towards the control element 31, with an annular seal 36, adapted to co-operate with the ridge 30. The closure element 34 moreover has a plurality of radial apertures 38, which allow communication between an annular space 37, defined by such member 34 and by the inner tube 28, and a second annular space 39 defined by such member 34 and by the outer tube 25.

In normal rest conditions, namely in the absence of pressure, the spring 35, as illustrated in FIG. 2, maintains the closure member 34 in a position in which it contacts the annular ridge 30 on the inner tube 28, preventing flow of fluid from the conduit 21 to the chamber A of the cylinder.

The other valve unit 24 is arranged in a way such that its closure member 34' abuts the ridge 30' to prevent fluid from passing from the chamber B of the cylinder, to the conduit 23, which is presumed for the moment to be an outlet conduit.

When fluid enters under pressure through the conduit 21, it passes through the holes 29 to act on the closure member 34, causing axial movement of such member 34 towards the head 11, overcoming the biasing action of the spring 35. In this way fluid is allowed to pass through the composite conduit formed by the conduit portion 21, space 37, the radial holes 38, the second space 39 and the radial holes 26 to reach the chamber A of the cylinder. Acting in this chamber, the fluid causes retraction of the piston 13, i.e., movement towards the left in the drawings.

At the same time, fluid which occupies the chamber B of the cylinder is discharged through the conduit 23 in the cylinder 10. This flow is possible because the pressure of the fluid in the chamber A causes movement towards the left of the control element 31' of the second valve unit 24, and the consequent movement in the same direction of the closure member 34', against the action of the biasing spring 35'. This establishes communication between the chamber B and the exterior conduit 23 through the composite conduit 26', 39', 38', 37', 29', 28', 23.

If the supply pressure in the conduits 23 fails in this condition of the cylinder the two closure members 34, 34' of the two valve units, impelled by the respective springs 35, 35', move into the closed position and prevent the passage of fluid both into the chamber A through the valve unit 22, and from the chamber B through the valve unit 24. The piston 13 of the cylinder remains locked in the position it then occupies.

When the fluid circulates in the opposite direction to that described above and shown by arrows in FIG. 3, moving the piston 13 towards the right, the valve units 22, 24 act in a manner symmetrical with the modes described above.

As is seen in FIG. 2, on one external annular wall of the cylinder 10 is fixed an annular element 40 of thin plate, in which are formed by means of cutting and bending a plurality of radial fins 41, designed to create a ventilating effect to cool the cowl 18. Such fins draw in external air through an annular space 42 between the cylinder 10 and a cup-shaped appendix 18b of the cowl, and convey the air through frontal apertures 43 towards the cowl, in a manner such as to impinge on its external surface and ensure cooling.

What we claim is:

1. A rotary fluid motor comprising a cylinder, a piston movable in said cylinder and dividing the cylinder into two chambers, a conduit for supplying fluid into each chamber, and valve means connected to said conduits, said valve means being located within the cylinder and extending axially from one end of said cylinder to the other through aperture means in said piston whereby, when fluid is supplied under pressure through either one of the conduits, said valve means permit the flow of fluid through that conduit and the discharge of fluid through the other conduit; the valve means being further adapted, when the pressure in the conduit through which fluid is supplied drops below a predetermined value, to close that conduit.

2. The cylinder of claim 1 in which the valve means comprises, for each conduit, a closure member urged by biasing means towards a position in which it prevents flow through that conduit, the closure member being adapted to yield to allow flow through that conduit when the pressure of fluid in that conduit overcomes the biasing means; and further including means adapted to cause the closure member controlling that conduit to yield when the pressure in the other chamber rises by a predetermined value above that in the chamber into which that conduit leads.

3. The cylinder of claim 2, in which the conduits each include a conduit portion formed in a wall of the cylinder, and the valve means comprises two valve units each having an outer tube passing sealingly through the piston and extending from end to end of the cylinder, an innter tube being contained with radial clearance in the outer tube to define a space, the valve unit being transversely divided into a first and a second part by an annular ridge on one of the tubes extending into said space, the first part of the inner tube being in communication with the conduit portion formed in the cylinder wall, and having an aperture in its wall adjacent the ridge to communicate with the space between the tubes, the outer tube having an aperture in its wall at each of its ends to communicate with the chamber at that end, the closure member comprising an annular element located slidably in the second part of the valve unit in the space between the tubes and having radial clearance with respect to the tube on which the ridge is formed but being in sealing contact with the other tube, a spring biasing the closure member towards a position in which it bears sealingly against the ridge to prevent flow in the outer tube past the ridge; and further including a control element located slidably and sealingly between the tubes in the first part of the valve unit and having a projection extending towards the closure member, the projection being adapted, when the control element is moved toward the ridge, to engage the closure member and move it away from the ridge to permit fluid to flow in the outer tube past the ridge.

4. The cylinder of claim 2, including a tubular member solidly connected to the piston, the tubular member having at one end an internally frusto-conical appendix, a tension member being connected to the tubular member by means of a frusto-conical expansible collet that is internally threaded and is screwed on to a threaded portion of the tension member, the collet extending into the cavity of the appendix of the tubular member and being secured by a locking ring which bears on the collet and is screwed on to a threaded part of the external surface of the appendix of the tubular member.

5. The cylinder of claim 2, including a fixed cowl surrounding a part of the cylinder with a space between the cylinder and cowl, and including a plurality of fins formed on the cylinder and extending into such space, and passages communicating with such space to permit the circulation air under the fan effect of the fins.

* * * * *